Aug. 22, 1939.  W. C. AGERELL ET AL  2,170,524
RADIATOR AND RADIATOR SHUTTER ASSEMBLY
Filed July 9, 1937  4 Sheets-Sheet 3
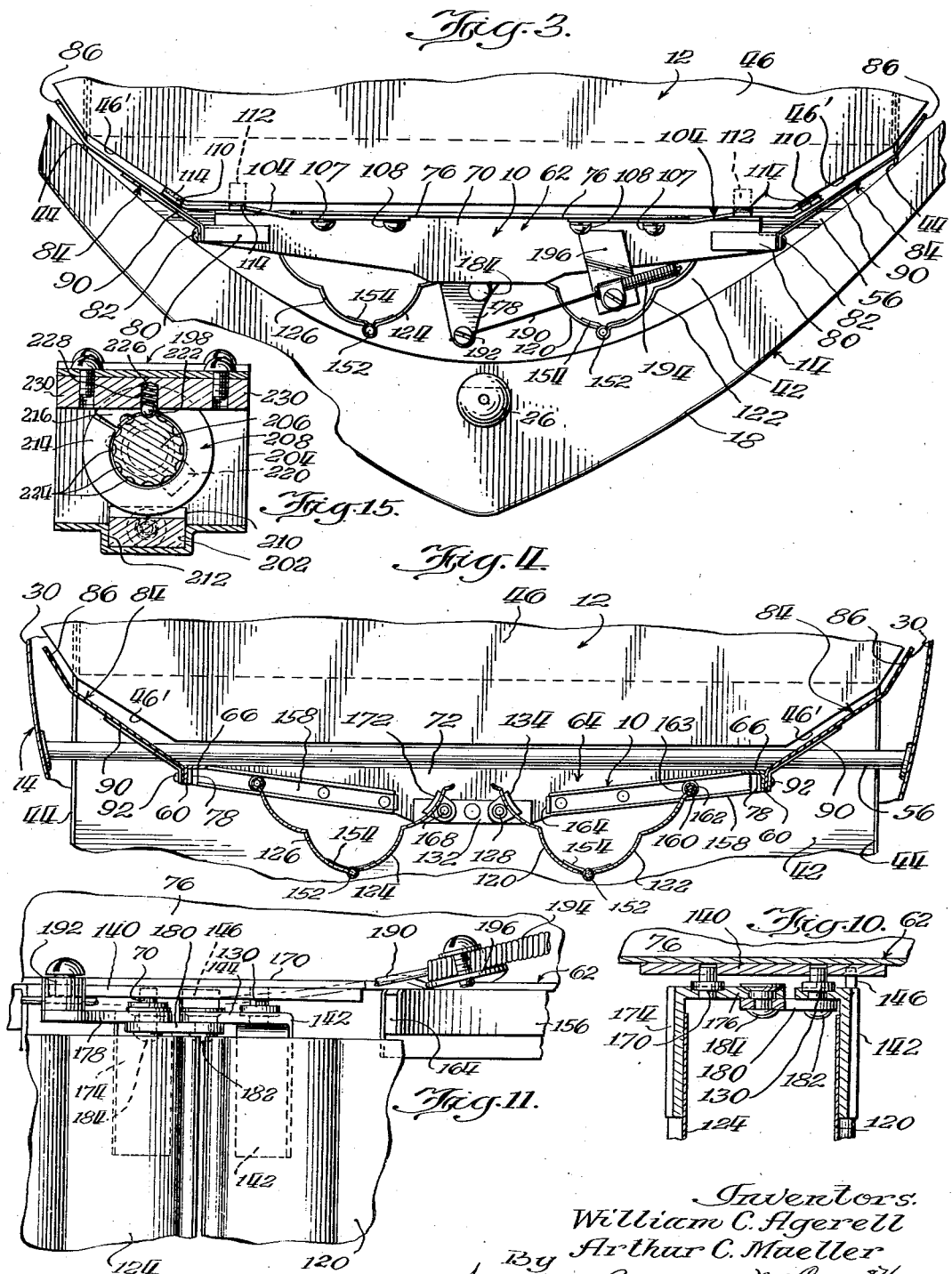
Inventors.
William C. Agerell
Arthur C. Mueller
By Williams, Bradbury, McCaleb & Hinkle
Attys.

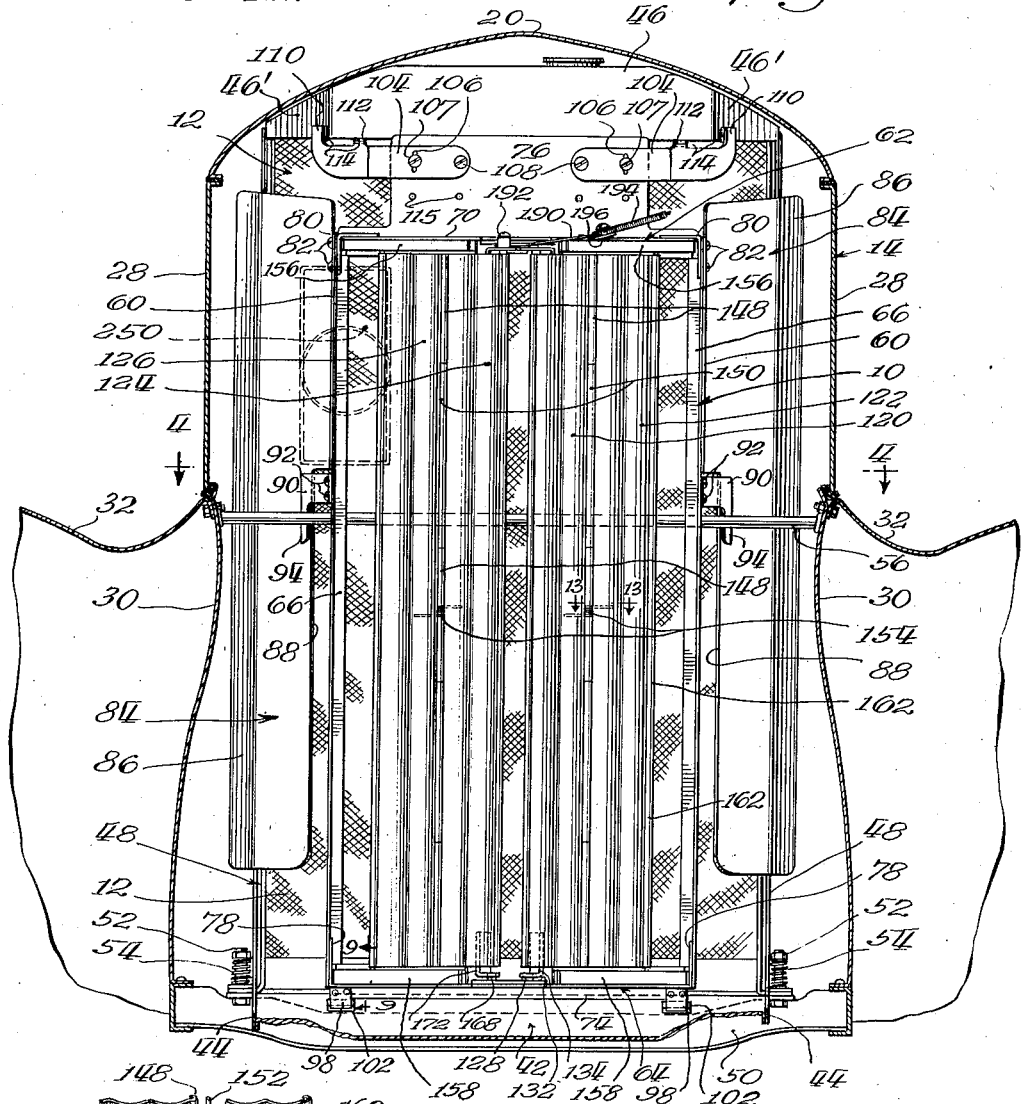

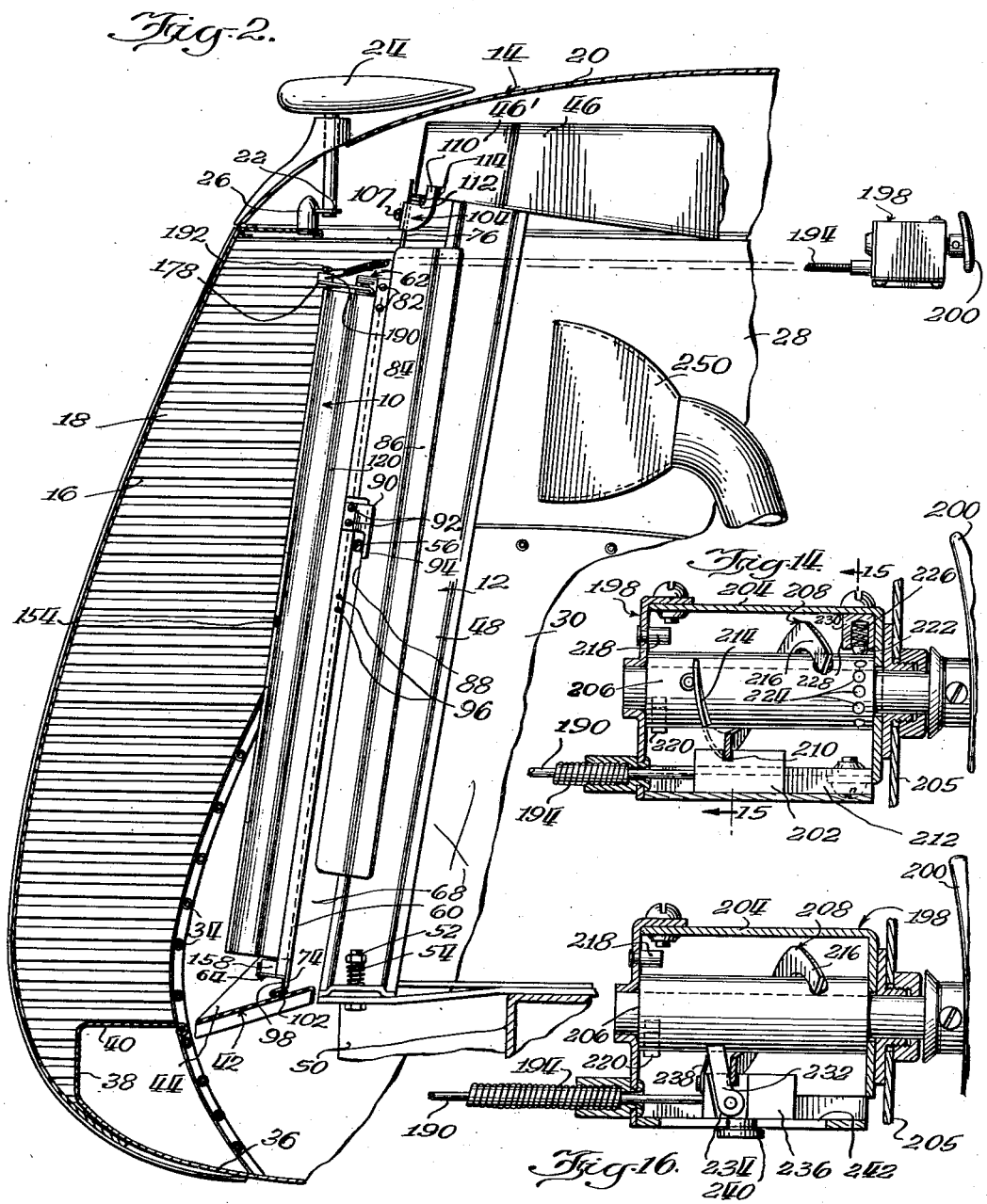

Aug. 22, 1939.  W. C. AGERELL ET AL  2,170,524
RADIATOR AND RADIATOR SHUTTER ASSEMBLY
Filed July 9, 1937  4 Sheets-Sheet 4
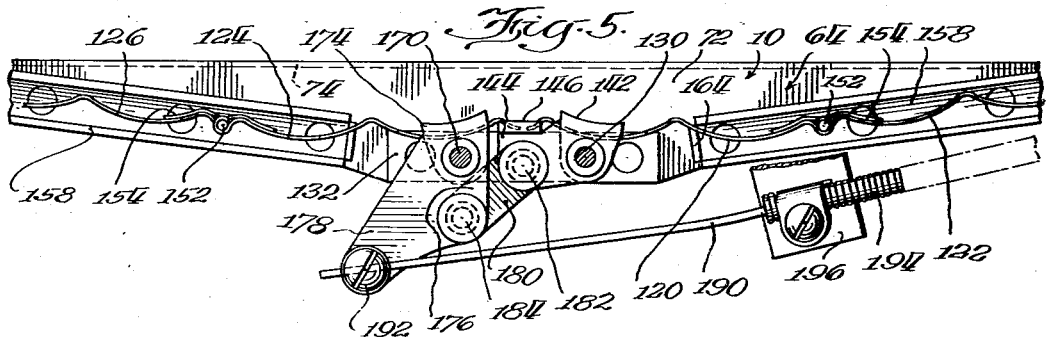
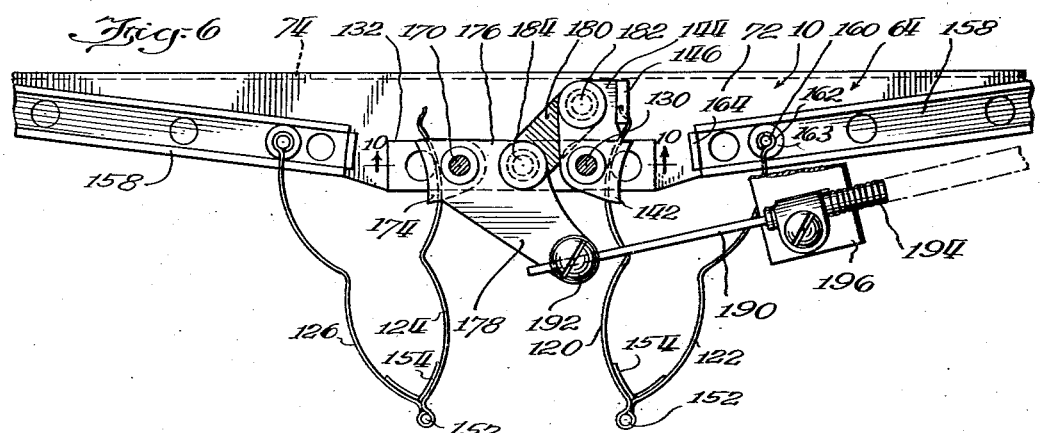
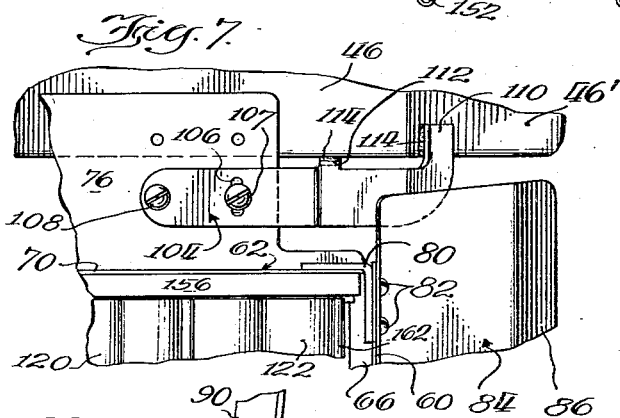
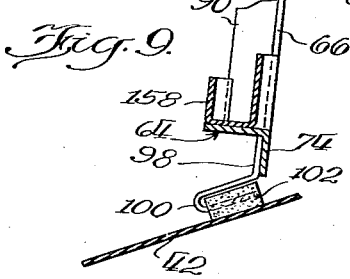
Inventors.
William C. Agerell
Arthur C. Mueller
By Williams, Bradbury, McCaleb & Hinkle
Attys Patented Aug. 22, 1939

2,170,524

UNITED STATES PATENT OFFICE

2,170,524

RADIATOR AND RADIATOR SHUTTER ASSEMBLY

William C. Agerell and Arthur C. Mueller, Chicago, Ill., assignors to Pines Winterfront Company, Chicago, Ill., a corporation of Delaware Application July 9, 1937, Serial No. 152,746

21 Claims. (Cl. 180—68)

The present invention relates to a radiator and radiator shutter unit assembly for automobiles and other automotive vehicles.

An object of the present invention is to provide a new and improved shutter unit.

A further object of the present invention is to provide an automobile radiator shutter unit comprising a fixed imperforate portion and movable shutter elements adapted to be placed within a surrounding shell having a sharp front, the shutter unit being constructed and arranged to provide a sufficient amount of and so distribute the air over the surface of the radiator that the efficiency of the cooling system remains substantially unimpaired by the addition of the shutter unit.

A further object of the present invention is to provide a shutter unit comprising fixed and movable portions in which the movable portions are adapted to be operated toward the center and front of the unit when opened, whereby the unit may be used with the modern sharp-nosed automobile fronts.

A further object of the present invention is to provide a removably mounted shutter unit adapted to be supported by a transverse tie rod, the unit being provided with vertically disposed rod-receiving slots whereby the unit may be moved in a vertical plane for mounting or dismounting and is prevented from moving longitudinally.

A further object of the invention is to provide a radiator shutter unit provided with novel structure for securing the top and bottom of the shutter unit against undesired movement.

A further object of the invention is to provide a shutter unit and a heater intake constructed to furnish an adequate supply of air to the heater at all times.

A further object of the invention is to provide a shutter unit with novel shutter element operating means.

A further object of the invention is to provide a shutter unit of a type adapted to be opened against a considerable resistance with operating means whereby the shutter elements may be opened relatively easily.

A further object of the invention is to provide an operating means for controlling the position of the shutter elements adapted to change rotary into straight line movement.

A further object of the invention is to provide a novel operating means adapted to maintain the shutter elements in selected open positions.

Further objects and advantages of the present invention will become apparent from the ensuing description, in the course of which reference is had to the accompanying drawings, in which:

Fig. 1 is a substantially vertical transverse section view through an automotive vehicle showing the radiator and radiator shutter unit assembly of the present invention in elevation;

Fig. 2 is a vertical longitudinal section through an automotive vehicle, showing in side elevation the radiator and radiator shutter unit assembly, and also illustrating diagrammatically manual operating means for the shutter elements and the relation of the shutter elements to the intake of an air heater;

Fig. 3 is a substantially horizontal longitudinal section through an automotive vehicle showing a top plan view of the shutter unit of the present invention;

Fig. 4 is a sectional view taken along the line 4—4 of Fig. 1;

Fig. 5 is a substantially horizontal section through the shutter unit showing the details of the shutter operating mechanism when the shutter elements are in their closed position;

Fig. 6 is a view similar to Fig. 5 showing the shutter elements in their open position;

Fig. 7 is an enlarged fragmentary front elevation showing the details of the means for positioning the upper end of the shutter unit with respect to the upper tank of the radiator;

Fig. 8 is a side elevation of the details shown in Fig. 7;

Fig. 9 is an enlarged fragmentary longitudinal vertical section through the radiator shutter unit taken along the line 9—9 of Fig. 1;

Fig. 10 is an enlarged fragmentary substantially vertical transverse section taken along the line 10—10 of Fig. 6 and showing details of construction of the shutter actuating mechanism;

Fig. 11 is an enlarged fragmentary front elevation illustrating in greater detail the construction of the shutter actuating mechanism;

Fig. 12 is a fragmentary exploded view showing the construction of a hinge joining two adjacent shutter elements;

Fig. 13 is an enlarged fragmentary section taken along the line 13—13 of Fig. 1 showing details of construction of a spring provided to bias the shutter elements to their closed positions;

Fig. 14 is a longitudinal vertical section through the manual operating means illustrated in Fig. 2;

Fig. 15 is a section taken along the line 15—15 of the apparatus illustrated in Fig. 14; and Fig. 16 is a view similar to Fig. 14 of a modified form of operating means.

Referring first to Figs. 1 and 2, the shutter unit of the present invention, designated as a whole by reference numeral 10, is shown in its installed position in front and spaced from the radiator 12, in which position it is removably mounted in a manner hereinafter to be described. The shutter unit, the radiator and the supporting means therefor lie and are concealed within a multiple piece structure forming a shell 14. The several parts of this shell are finished and collectively constitute the finishing piece for the radiator core.

While the specific construction of the shell forms no part of the present invention, a multiple piece structure has been illustrated and is described briefly. Before proceeding with this description it may be well to note that an integral finishing piece, such as the well known radiator shell that has been used for many years, may be substituted for the multiple piece structure here described.

In the present instance the shell 14 comprises a number of parts so constructed and arranged as substantially to encircle the radiator and radiator shutter unit and their supporting means, and to provide an open panel 16 in front of the shutter unit through which air may pass to the shutter unit and radiator core. In order to improve the external appearance of the outer shell the panel 16 is partly closed by grill work 18 of suitable design and, as shown in Fig. 2, having a relatively sharp front. The front has a substantially V-shaped horizontal section and extends farther forward at the bottom than at the top in order to conform to the positions of the radiator and shutter unit, both of which slant backward a slight amount.

The shell comprises an integral top panel 20 hinged at its rear end in a suitable manner (not shown) and is provided at its front end with a latch 22 adapted to be rotated by means of a handle 24 extending outside the panel. The latch is cooperatively associated with a slotted catch 26 secured in suitable manner to the grill work, as shown in Fig. 2. The upper portions of the side walls of the shell are formed by a pair of vertically disposed side panels 28 detachably mounted in suitable manner to supporting structure that has been omitted for the purpose of clarity. The lower ends of the side panels abut against the junction of downwardly extending skirts 30 and fenders 32 secured to each other and the chassis of the vehicle in accordance with well known principles. The grill work is secured to the side panels by a plurality of spaced bolts 34.

The bottom of the shell 14 is formed by a baffle 36 having a vertical front wall 38 and a horizontal top wall 40 and fitting snugly within the grill work 18 wherein it is mounted. The baffle, together with an apron 42 extending forwardly and downwardly from the bottom of the radiator 12 to meet the top wall 40 of the baffle, serves to direct the flow of air to the shutter and also to prevent the splashing of mud or like material into the radiator core. The apron 42 is secured in the position described by welding it to a pair of triangular supports 44 welded to the side frames of the radiator core.

The radiator core 12 and the upper radiator tank 46 may be supported upon the chassis of the vehicle in suitable manner, and in the present instance are illustrated as being supported by channeled side frames 48 to which the core is secured, as by welding. The lower ends of the side frames are provided with horizontal flanges adapted to be secured in resilient fashion to the front cross piece 50 of the chassis by bolts 52 and springs 54 surrounding the latter and biasing the side frames toward the cross piece.

The shutter unit of the present invention is removably supported in spaced relationship to the front face of the radiator core in novel manner upon the apron 42, the lower front corner of the radiator tank 46 and a transverse tie rod 56. The tie rod is located about half way between the top and bottom of the radiator core and is secured in suitable manner at its ends to the upper ends of the skirts 30. It thus serves not only as the primary positioning means for the shutter unit but also as a means for preventing spreading of the side walls of the shell 14.

The shutter unit comprises substantially imperforate fixed portions and movable shutter elements so constructed and arranged with respect to each other that the unit may be readily mounted within an enclosing shell having a sharp front, as that of the type described above. In order that the shutter elements may be readily actuated from closed to open position in a front of this type, the size of the movable portion of the unit has been made smaller than that of the radiator core, and the fixed portion is provided with imperforate panels which serve to distribute the air flow over substantially the entire surface of the radiator core.

The shutter unit forming one of the primary features of the present invention comprises a pair of side frame members 60, a top frame member 62 and a bottom frame member 64. The side frame members are formed of 90° angle irons having their rear flanges 66 opposed to each other, and while disposed substantially parallel to the front face of the core 12 are spaced forward therefrom to provide a compartment 68 between the shutter unit and the core.

The top and bottom frame members are formed with horizontally disposed generally triangular portions 70 and 72, respectively, with the inclined sides thereof located at the front. The bottom frame member 64 is provided with a downwardly extending rear flange 74, and the upper frame member 62 is provided with an upwardly extending rear portion 76 having a width somewhat less than that of the frame member itself and extending substantially to the bottom of the upper radiator tank 46, as shown in Fig. 1. The rear portion 76 functions, together with the radiator tank 46, to direct the air flowing through the shutter to the upper part of the radiator core and also to support tank engaging fingers described hereinafter.

The bottom frame member 64 is secured to the side frame members 60 by means of a pair of vertical extensions 78 formed integrally therewith and welded to the side frame members. The top frame member 62 is secured to the side frame members by means of a pair of right angled brackets 80 having their horizontal portions welded to the top side of the upper frame member and their vertical portions secured to the side frame members by screw bolts 82.

The shutter frame described above embraces a lesser area than the radiator core, and in order substantially to limit the flow of air to the core through the opening defined by the frame, a pair of laterally extending side wings 84 of a configuration following in general the interior of the front portion of the outer shell are secured to the side frames. The upper portions of the side wings are preferably welded to the side frames of the shutter unit and are also secured to the latter by the previously mentioned screw bolts 82. The side wings have rearwardly extending end portions 86 that fit into the space between the side walls of the radiator core and the shell 14, thus providing means for directing the flow of air over the entire core area. They are also cut away at their lower front ends, as indicated at 88, in order that the shutter unit may be removably supported by the tie rod 56.

The shutter unit is supported not only by the tie rod 56 but also by the apron 42 and the lower front corner of the upper radiator tank 46. The support is so constructed that once the shutter unit is properly mounted in front of the radiator core it can not be moved by forces to which it is normally subjected.

The shutter is secured against longitudinal displacement by the tie rod 56 which is adapted slidably to fit into an open bottom slot defined by the tie rod guide members 90 and the side frames. The guide members 90 are secured to the side frames by screw bolts 92 with the finger 94 thereof extending downward substantially parallel to the side frames. The tie rod thus bears against the rear of the side frame members and the front edges of the fingers. The side frame members are also provided with a pair of threaded openings 96 (see Fig. 2) so that the slot defining members 90 may be moved to a lower position to receive tie rods which may be located at a lower level.

The bottom of the shutter unit is resiliently supported against undesired movement by means of a pair of spaced apart resilient brackets 98 welded to the downwardly depending flange 74 of the bottom frame member. The brackets 98 comprise, as shown best in Fig. 9, a reverse bend 100 defining a rearwardly extending projection or finger adapted to receive a tubular piece of rubber 102. The rubber is maintained in frictional contact with the apron by the resiliency of the bracket which serves a purpose similar to that of a compression spring.

The upper end of the shutter unit is positioned against vertical, rearward and sidewise movement by means of a pair of resilient fingers 104 adjustably mounted upon the upwardly extending rear portion 76 of the top frame member. The fingers are provided with arcuate slots 106 intermediate their ends and cooperating bolts 107 whereby they may be rotated about pivot bolts 108 for proper adjustment with respect to the lower corner of the radiator tank 46. The fingers are provided with vertically disposed extensions 110 adapted to engage the diagonal portions 46' of the front wall of the radiator tank for preventing rearward and sidewise movement of the shutter unit, and with horizontal rearwardly extending extensions 112 adapted to abut against the bottom wall of the radiator tank for preventing upward movement of the unit. The extensions 110 and 112 may have resilient rubber spacers 114 secured thereto in order better to prevent vibration of the shutter unit. Where the upper radiator tank lacks diagonally extending walls it is contemplated that the extensions 110 and 112 will abut against the front and bottom walls of the radiator.

The shutter unit is adapted to be used with radiator cores of various heights, as may be noted from a comparison of Figs. 1 and 7. In Fig. 1 the fingers 104 are shown supported near the top of the vertical portion 76 of the top frame member and in Fig. 7 the fingers are shown mounted at a lower level in the openings 115.

The movable portion of the shutter unit comprises a plurality of vertically disposed movable shutter elements 120, 122, 124 and 126 of a width sufficient entirely to close the opening defined by the frame in one position and are supported in novel manner for actuation into a position substantially central and forward of the opening to permit the flow of air to the radiator core. The shutter elements 120 and 122 constitute the first pair of shutter elements and elements 124 and 126 constitute the second pair of elements adapted to be operated simultaneously by a mechanism to be described shortly.

The shutter element 120 is mounted for pivotal movement about one edge thereof substantially centrally of the frame by means of a lower pivot pin 128 and an upper pivot pin 130. The lower end of the lower pivot pin is mounted in a flat strip of metal 132 secured to the top side of the lower frame member 64 and the upper end of the pin fits into a recess formed in a right angled lug 134 having its vertical portion welded to the shutter element 120 near the inner edge of the latter, as shown in Fig. 4. The upper end of pivot pin 130 is mounted in a strip of metal 140 similar to strip 132 and the lower end fits into a recess formed in a right angled lug 142 having its downwardly depending vertical portion secured to the shutter element 120. The lug 142 is provided with an integral extension 144 constituting a crank arm lying in the plane of the horizontal portion of the lug, and with an upwardly extending flange 146 adapted to strike against the strip 140 in order to prevent further movement of the shutter elements after these have been operated into their closed position.

The shutter element 122 is supported solely by the shutter element 120 by means of a hinge comprising beaded portions 148 and 150 formed on adjacent edges of the shutter elements 120 and 122, respectively, and a pin 152 extending through the beaded portions. The shutter elements are prevented from rattling and are biased to move to their closed position by means of a spring 154 mounted upon the hinged pin 152. The shutter element 122 is guided in its movements by a pair of channels 156 and 158 riveted, or otherwise suitably secured, to the top and bottom frame members, respectively. The rear walls of the channels have a height somewhat greater than the front walls in order that the ends of the shutter elements will abut thereagainst and thus be positively restrained from further movement even though subjected to a considerable air pressure. The shutter element 122 is guided in the channels by means of a longitudinal rod 160 secured by means of a beaded edge 162 to the shutter unit and extending into the channels. The movement of the rod 160 in the channels is made substantially frictionless by providing it with rollers 163 engaging the side walls of the channels. The rod 160 is prevented from escaping from the channels by providing the latter with end extensions 164 forming stops against which the roller 163 abuts when moved a predetermined extent.

The shutter element 124 is mounted in substantially the same manner as the shutter element 120 on a pair of pivot pins 168 and 170 having their outer ends mounted in the metallic strips 132 and 142, respectively, and their inner ends in right angled lugs 172 and 174 secured to the shutter element.

The upper lug 174 is provided with horizontal extensions 176 and 178 constituting short and long crank arms through which the shutter elements are operated, as hereinafter described. The crank arm 176 is adapted to be connected in pivotal manner to crank arm 144 by a connecting link 180 and pivot pins 182 and 184.

The shutter element 126 is hingedly supported from shutter element 124 by a hinge constructed of beaded edges 148 and 150 formed on adjacent edges of these elements and a pin 152 extending therethrough. The shutter element 126 is guided in its movement in opposed channels 156 and 158, similar in construction to the corresponding channels guiding movement of shutter element 122. Further description of the means for guiding movement of shutter element 126 is deemed unnecessary at this point because it is identical with that provided for element 122.

The shutter elements are operated from a distance through a flexible cable 190 secured at its end to the crank arm 178 by a screw connector 192 and slidably mounted in a flexible conduit 194. It should be understood, however, that the shutter may be operated through other means, such as a rod, equally well. The conduit 194 is fixedly secured in spaced relationship to the crank arm 178 upon a bracket 196 welded, or otherwise secured, to the top frame member 82 and extends therefrom to manual operating means 198 adapted to be mounted upon the dashboard of the vehicle.

The manual operating means 198 of the present invention is illustrated in detail in Figs. 14 and 15 from which it may be seen to comprise means for changing rotary into reciprocating motion which renders the operation of the shutter elements comparatively easy. The shutter elements previously described are quite wide and, therefore, are subjected to considerable air pressure, particularly at high speeds. Since they are opened forward into the longest portion of the surrounding shell they must be opened against this pressure. For this reason the operating means is also constructed in such manner that during initial opening movement the rotation of the operating handle 200 through unit distances moves the cam follower 202, to which the other end of the cable is attached, through shorter distances than during final opening movement.

The manual operating means comprises a suitable casing 204 secured to a dashboard 205 and within which is journalled a shaft 206 adapted to be rotated by the knob 200. A cam 208 comprising a curved strip of metal is secured to the shaft and, as shown in Fig. 14, it extends into a diagonal groove 210 formed in the cam follower 202, whereby the latter is moved longitudinally in a slot 212 as the shaft is rotated.

To provide the slow initial opening of the shutter elements mentioned above the front half 214 of the cam is made with a very slight curvature and the rear half 216 with a considerably greater curvature. In the illustrated embodiment the cam has been constructed so that the follower is moved one-third the length of the slot during the first half turn of the shaft and two-thirds the length during the final half turn of the shaft. It should be understood that these values are only illustrative.

The rotation of the shaft is restricted to substantially a single turn by a stop 218 secured to the front wall of the casing and adapted to be engaged by a projection 220 secured to the shaft. Suitable indicating indicia may be associated with the operating means to show the position of the shutters.

The shutter of the present invention is, as has been mentioned previously, subjected to considerable pressure at high speeds, and to prevent the undesired closing of the shutter resilient movement restricting means have been provided. In the present instance this means comprises a spring pressed ball 222 and a plurality of spaced indentations 224 on the surface of the shaft. The ball 222 and its biasing spring 226 are mounted in an opening 228 formed in a block 230 secured to one of the side walls of the casing.

The modified form of manual operating means illustrated in Fig. 16 is identical with respect to that illustrated in Figs. 14 and 15 with the exception of the movement restraining means and cam follower. In this embodiment the movement restraining means comprises a dog 232 pivotally mounted in a longtudinally extending slot 234 formed in the cam follower 236. The dog is biased into engagement with the shaft 206 by a leaf spring 238 mounted on the follower to prevent longitudinal movement of the follower in shutter closing direction with respect to the shaft. Rotation of the shaft in a direction to effect closure of the shutter causes the cam 208 to engage the dog 232 and turn it in a counterclockwise direction. This movement of the dog effects movement of the latter out of engagement with the shaft and permits the follower to move.

The cam follower 236 of the present embodiment is guided in its movement by a pin 240 fitting into a slot 242 formed in the bottom wall of the casing.

A shutter unit embodying the present invention is advantageously combined with a heater air inlet 250 having a rectangular opening. The opening is located with its longer side vertically disposed and in line with one of the openings formed when the shutter is operated to its open position, as shown best in Fig. 1. It is evident from an inspection of this figure that the shutter element 126 serves to direct a considerable amount of air to the inlet even when only slightly opened. The arrangement provides an increased supply of air to the heater over the entire range of shutter opening. It should be apparent also that the vertical length of the inlet may be changed to meet varying requirements.

From the above detailed description it should be apparent that the present invention provides a shutter unit and assembly relatively simple in construction and admirably suited for use with automotive vehicles having sharp fronts. The unit is readily installed in position and just as easily removed for repairs. To install the unit it is necessary only to remove a portion of the surrounding shell 14 and then insert the shutter unit in place in such manner that the tie rod 56 fits into the slot formed by the tie rod guides 90 and side frames. The resilient brackets 98 at the bottom of the unit are readily forced into place and serve resiliently to support the unit upon the apron. The top is even more readily positioned by the resilient fingers 104 which are forced against the lower forward corner of the upper radiator tank by the action of the brackets 98.

Once installed the manual operating means is connected to the crank mechanism by fastening the flexible cable to the crank arm 178 and the flexible cable conduit to the bracket 196.

The shutter elements are easily moved into open position, even against considerable air pressure by the manual operating means. The construction of the cam with two portions of varying curvature enables the operator to initiate the opening movement of the shutter with ease, and the movement restricting means prevents the air pressure from reclosing the shutter.

While a preferred embodiment of the shutter unit and assembly has been described above, many modifications thereof may be made without departing from the spirit of the invention. The manual operating means, of which two embodiments have been described, likewise may be modified and it is contemplated that the invention is not limited to the precise details of construction set forth.

We claim:

1. In a radiator shutter adapted to be supported in front of and spaced from a radiator, the combination including, a frame defining an opening having a height substantially equal to the height of the radiator core and a width substantially less than the width of the core, means removably supporting said frame substantially parallel to but spaced forward from the core, shutter elements movably mounted in said opening, and side wings secured to said frame and extending laterally and rearwardly substantially to the edges of the radiator core, thereby to distribute air flowing through said opening over substantially the entire area of the core.

2. In a radiator shutter adapted to be supported in front of a radiator, the combination including, an opening defining frame secured a substantial distance forward of the front face of the radiator core, the opening having a height substantially equal to the height of and a width substantially less than the width of the radiator core and having an area considerably less than that of the front face of the radiator core, shutter elements carried by said frame adapted selectively to be operated to permit flow of air through said opening, and means attached to the frame for directing the air flowing through said opening into contact with substantially the entire core.

3. In a radiator shutter adapted to be supported in front of a radiator surrounded but spaced from a shell terminating in a sharp front, the combination including, an opening defining frame of smaller size than the radiator and adapted substantially to be surrounded by said shell, shutter elements supported in said opening by said frame, and side wings secured to said frame extending laterally and rearwardly into the space between the side walls of the radiator and the shell, thereby limiting the flow of air to the radiator to the opening defined by said frame.

4. In a radiator shutter adapted to be positioned in front of a radiator surrounded by a shell by a support comprising a transversely extending shell tie rod, the combination including a frame of a smaller size than the radiator, shutter elements supported thereby, members secured to the side members of the frame and defining therewith open bottom slots adapted to receive the tie rod, and side wings secured to the side members of the frame for limiting the flow of air to the radiator to the area covered by the shutters, said side wings having a portion thereof cut away to provide slots to receive the tie rod.

5. A radiator and radiator shutter assembly including in combination, a radiator, a shutter, a shell surrounding said radiator and shutter and terminating in a sharp front having a substantially V-shaped horizontal section, said shutter comprising fixed and movable portions, said fixed portion including a frame located forward of the radiator and said movable portion including a plurality of vertically disposed shutter elements movably supported in said frame for movement forward of the frame and to the center of the space enclosed by said shell.

6. A radiator and radiator shutter assembly including in combination, a radiator, a shutter, a shell surrounding said radiator and shutter and terminating in a front having a substantially V-shaped horizontal section, said shutter comprising fixed and movable portions, said fixed portion including a frame located forward of the radiator and said movable portion including two pairs of vertically disposed shutter elements, one of each of said pairs being pivotally mounted centrally of said frame, the others being hinged to said first elements and having their movement so guided that when the shutter is opened the elements are brought to the center of the shell.

7. In a radiator shutter adapted to be supported by a transverse tie rod and radiator assembly comprising a radiator tank and a transverse lower support, the combination including, a frame, shutter elements mounted therein, said frame comprising a pair of spaced apart side frame members, a rearwardly and downwardly extending guide secured to each side frame member, said guides defining with said side frame members vertical slots adapted slidably to receive said tie rod, and means adapted to abut against the radiator tank and transverse lower support co-operatively associated with said guides and tie rod for supporting said shutter.

8. In a radiator shutter adapted to be supported by a transverse tie rod and radiator assembly comprising a radiator tank and a transverse lower support, the combination including, a frame, shutter elements mounted therein, said frame comprising a pair of spaced apart side frame members, means adapted to be supported by said side frame members and defining with the rear faces of the latter vertically disposed slots adapted slidably to receive the tie rod, and means adapted to abut against the radiator tank and transverse lower support co-operatively associated with said guides and tie rods for supporting said shutter.

9. In combination with a radiator and a surrounding shell, a rod extending transversely and in front of said radiator for tying the sides of said shell together, and a radiator shutter removably supported by said tie rod, said shutter comprising a pair of spaced apart side frame members, and means supported by said side frames defining vertically extending slots adapted to receive said tie rod.

10. In a radiator shutter, a frame, and shutter elements mounted therein, said frame comprising a top frame member having a portion extending upward into abutting engagement with the under surface of the radiator tank for positioning the shutter with respect to the tank and resilient means for forcing said frame upwardly.

11. In a radiator shutter, a frame, and shutter elements mounted therein, said frame comprising a top frame member having an upwardly extending portion and relatively resilient projecting members mounted thereon adapted to engage the lower front corner of the upper radiator tank for positioning the shutter with respect to the tank.

12. A radiator shutter for insertion in front of a radiator tank having a diagonally extending front wall, including in combination, a frame, and shutter elements mounted therein, said frame comprising a top frame member having an upwardly extending portion and a pair of resilient projecting members mounted thereon provided with extensions adapted to abut against the bottom and the diagonally extending front walls of the upper radiator tank for positioning the shutter with respect to the tank.

13. In a radiator shutter adapted to be supported on a sloping transverse support, a frame, and shutter elements mounted therein, said frame comprising a top frame member and a bottom frame member having secured thereto resilient supporting brackets provided with surfaces adapted to bear against the support to maintain said top frame member in abutting engagement with its associated support.

14. In a radiator shutter, a frame, and shutter elements mounted therein, said frame comprising a top frame member adapted to abut against a support and a bottom frame member having secured thereto resilient brackets each comprising a rearwardly projecting extension provided with a tubular piece of rubber provided with surfaces adapted to bear against the support to maintain said top frame member in abutting engagement with its associated support.

15. In combination with a radiator assembly, a transverse support located in front of the radiator, a shutter unit adapted to be placed in front of said radiator, said unit comprising a frame and shutter elements mounted therein, said frame comprising a bottom frame member having secured thereto a pair of relatively resilient brackets, said brackets comprising a rearwardly projecting extension having a tubular piece of rubber mounted thereon for frictionally and resiliently supporting said unit upon said transverse support.

16. In a radiator shutter, a frame, and shutter elements mounted therein, said frame comprising spaced apart top and bottom frame members, said top frame member having a portion extending upward into abutting engagement with the radiator tank, and said bottom frame member having secured thereto resilient brackets adapted to be supported upon a suitable support, said brackets providing compression members for maintaining said portion of the top frame member in abutting engagement with the radiator tank.

17. In a radiator shutter, a frame, and shutter elements mounted therein, said frame comprising spaced apart top and bottom frame members, said top frame member having an upwardly extending portion, a pair of projecting fingers secured thereto and provided with extensions adapted to abut against the bottom and front walls of the upper radiator tank, said bottom frame member having secured thereto a pair of resilient brackets, each of said brackets comprising a rearwardly projecting finger adapted to be mounted upon a lower support for the shutter.

18. In a radiator shutter unit adapted removably to be positioned in front of a radiator by a transverse bottom support, a transversely extending radiator shell tie rod, and the upper radiator tank, the combination including, a frame, shutter elements mounted therein, said frame comprising a pair of side frame members, a top frame member and a bottom frame member, said side frame members having secured thereto means defining with the rear edge of the latter vertically disposed slots through which the tie rod extends to prevent longitudinal displacement of the shutter with respect to the radiator, said bottom frame member having secured thereto brackets for supporting said frame upon said transverse support, and said top frame member having secured thereto members adapted to abut against the lower front corner of the radiator tank for preventing rearward, upward, and sidewise displacement of the shutter.

19. A radiator and radiator shutter assembly including in combination, a radiator, a shutter, a shell surrounding said radiator and shutter and terminating in a relatively sharp front having a substantially V-shaped horizontal section, said shutter comprising a substantially rectangular frame positioned a substantial distance forward of the front face of the radiator core and defining an opening having an area considerably less than that of the front face of said core, and shutter elements movably supported in said frame for movement forward of and toward the center of said frame.

20. A radiator and radiator shutter assembly including in combination, a radiator, a shutter, and a shell surrounding said radiator and shutter and terminating in a relatively sharp front having a substantially V-shaped horizontal section, said shutter comprising a unitary structure supported in the space defined by the radiator and shell for removal directly from the front of the radiator, said structure including fixed and movable portions, said fixed portion defining a central opening spaced forward and having an area considerably less than the area of the front face of the radiator core and providing means for directing the air flowing through said opening into contact with substantially the entire core, and said movable portion including shutter elements for controlling the flow of air through said opening.

21. A shutter for a vehicle comprising a radiator having an upper radiator tank, including in combination, a frame and shutter elements mounted therein, said frame comprising an upwardly extending portion and relatively resilient projecting members adjustably mounted on said portion adapted to engage the lower front corners of the tank for positioning the shutter relative to radiators and tanks of different sizes.

WILLIAM C. AGERELL.
ARTHUR C. MUELLER.